Feb. 6, 1968  R. D. GOOD  3,367,034
MEAL DESOLVENTIZING AND DEODORIZING SYSTEM AND PROCESS
Filed Oct. 23, 1965
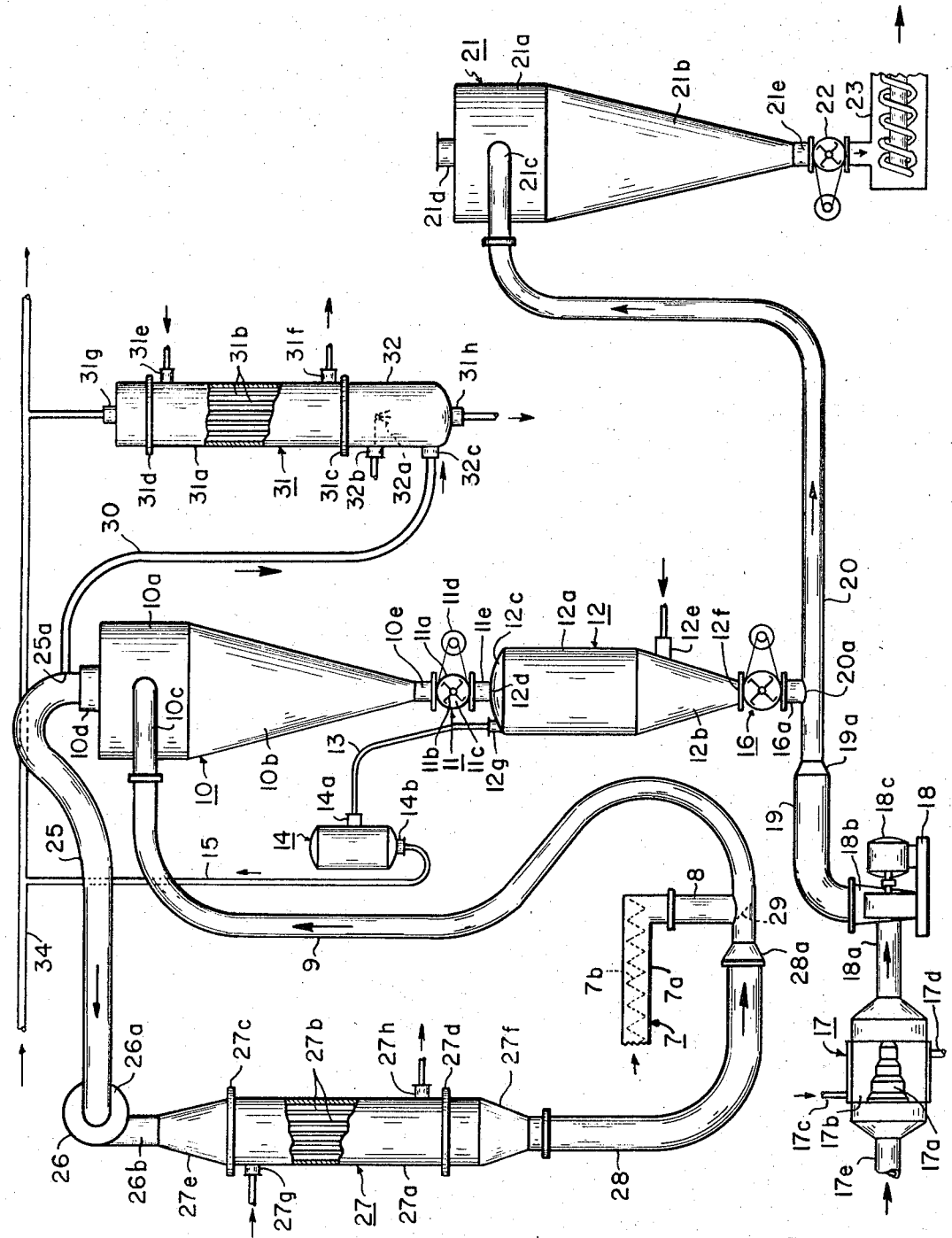
INVENTOR.
Robert D. Good
BY
HIS ATTORNEY United States Patent Office 3,367,034
Patented Feb. 6, 1968

3,367,034
MEAL DESOLVENTIZING AND DEODORIZING
SYSTEM AND PROCESS
Robert D. Good, Pittsburgh, Pa., assignor to Blaw-Knox Company, Pittsburgh, Pa., a corporation of Delaware
Filed Oct. 23, 1965, Ser. No. 503,813
8 Claims. (Cl. 34—10)

ABSTRACT OF THE DISCLOSURE

This invention is apparatus and process for continuous separation of solvents from finely-composed or powdery particles such as pulverized meal wherein the material is contacted with super heated continuously recycled solvent vapor, flash separating solvent from said material, then contacting said material with an inert gas, then contacting said material with a flow of cool air.

---

This invention pertains to the removal of solvents from organic materials. More particularly, this invention relates to a system for the continuous separation of commercial solvents from finely-composed or powdery particles such as pulverized meal or the high-protein meal produced as a by-product of the solvent extraction of oil from particulate solids such as rice bran, corn germ, and other vegetable materials.

Commercial solvent extraction of oil or fats from organic materials yields a miscella or solution of oil in solvent and a substantially oil-free solids product containing a substantial amount of residual solvent. This solids product is then put through a desolventizing operation to remove the solvent, to produce a dry, solvent free product and to recover the solvent for recycle to the extraction step. When the material being treated is grain, bran, nuts or other vegetable matter or fragmented animal bones, the solvent recovery operation also serves to render the material fit for use as food for livestock. In the production of such food, a primary desolventizing operation generally recovers well above 90% of the solvent, and further desolventizing, known in the art as deodorizing, is then employed to remove traces of solvent that might create a disagreeable taste, odor or appearance and thereby adversely affect palatability of the product.

In the prior art, the value of flash desolventizing has been clearly recognized. Flash desolventizing has been found extremely useful for the production of specialty products that require rapid solvent removal and short retention time of the solid material within the system to preserve the heat-sensitive protein fraction of the material. The cost of installation and operation of a flash desolventizing system is generally much lower than that of the conventional horizontal desolventizing units. However, it will be observed that flash desolventizers of the prior art generally deliver a final product that would be equivalent to removing material from the present invention at an intermediate point during the treatment process.

It is the purpose of the present invention to acknowledge and preserve the advantages of flash desolventizing such as clearly outlined in a paper by P. A. Belter, O. L. Brekke, G. F. Walther, and A. K. Smith presented at a meeting of the American Oil Chemists' Society in November of 1953 (reprinted: J. Am. Oil Chemists' Soc., 31(10): 401–403, October 1954).

In the more recent past an air cooling cyclone has been placed in successive flow connection with a flash desolventizer so that an air stream provides rapid cooling to minimize denaturization of the heat sensitive protein and to provide a cool final product. A system of this type was described in a paper presented by O. L. Brekke, G. C. Mustakas, M. C. Raether, and E. L. Griffin at the meeting of the American Oil Chemists' Society of April 1958 (reprinted: J. Am. Oil Chemists' Soc., 36(6): 256–260, June 1959). A shortcoming of this latter system and other conventional flash desolventizers is that the scope of such systems is limited because no deodorizing treatment is included to remove residual traces of solvent remaining in the material. The failure to include a deodorizing step is understandable since it has always been believed that denaturization can apparently only be avoided by maintaining a short retention time of material within the system. Thus, it is the purpose of the present invention to provide a system for flash desolventizing vegetable materials and introduce longer time of retention in such a system during which the protein fraction will be preserved and the material will be sufficiently deodorized in accordance with present market demands.

Thus, it is a primary objective of my invention to provide a rapid desolventizing system that includes deodorization of the material under treatment at substantially low temperatures so that protein denaturization will be reduced to a minimum, hence, increasing the marketability of flash desolventized products.

It is also an objective of my invention to provide a new and improved high speed or flash desolventizing system for removing solvent from meal or other materials consisting of finely-divided or minute particles.

Another objective of my invention is to provide means for rapid recovery of reuseable solvent.

It is a further objective of my invention to accomplish the preceding objectives in a manner which will provide not only a new and improved desolventizing system but will enable such desolventizing at lower installation and operating costs than heretofore provided.

To afford a clear understanding of the material treatment or process which takes place in my system, it will first be explained as though comprising separate individual steps, although the process is actually a continuous operation. The initial treatment step involves intimately contacting the solvent-wet meal with superheated solvent vapor within a first reaction chamber or solvent-mixing chamber that is preferably of an elongated slender configuration. The superheated solvent vapor thus injected into the material is supplied in such quantity that its sensible heat in vapor form exceeds somewhat the heat of vaporization of the residual solvent in the meal, and in a preferred embodiment of my invention the superheated vapor is blown into the chamber at a substantially high velocity and thus contributes to the propelling of the meal along the length of the chamber. When the superheated vaporized solvent mixes with the solvent-wet meal within this mixing chamber, heat is transferred therefrom to the meal and the residual solvent therein is thereby evaporated and expands as it changes to the vapor form. This volumetric expansion is due to the flashing of the liquid solvent to vapor, also contributes to propelling the material through the elongated chamber at relatively high velocity.

The outlet end leading from the mixing chamber is connected to a second reaction chamber in the form of a flash desolventizer cyclone wherein the solvent vapor and meal are blown rapidly about in a whirlwind configuration so that the meal and vapor separate by centrifugal force, with the dry meal dropping downwardly and out of the flash desolventizer cyclone as the solvent vapor rises into a take-off conduit at the center to be recycled and reheated for return by the blower into new solvent-wet material entering the system as previously described.

From the flash desolventizer, the desolventized meal is passed into a meal holder or gas-injection reservoir, which is a third reaction chamber wherein the meal is subjected to a countercurrent flow of inert gas to remove residual solvent traces, and from the reservoir the meal next enters a fourth reaction chamber or aeration chamber. A co-current flow of high velocity air is fed into the aeration chamber to dispel any lingering minute solvent traces and to cool the now solvent-free meal. The air thus blown into the aeration chamber is thus preferably conducted thereto by means of a conduit leading from a location exterior to the plant in which the system is located so that the meal is subjected to relatively cool and clean atmospheric air. In a preferred embodiment of my invention, the high velocity air is the means of transporting the meal through an elongated form of the aeration chamber.

From the aeration chamber the meal enters a fifth reaction chamber which is a flash cyclone unit that is utilized to separate the air that was mixed with the meal in the previous chamber, and the operation within the cooling cyclone is similar to the helical whirlwind action which took place in the second reaction chamber or desolventizer cyclone. Air, with the heat it has absorbed from the meal, is vented out of the cooling cyclone and back into the atmosphere, and cooled meal is discharged from the cooling cyclone to a typical conveyor means to transport it away from the system to other facilities, the nature of which will depend upon the specific, intended purpose of the treated meal.

The solvent-vapor recycle system, consisting of the first-mentioned contacting chamber, the flash desolventizer cyclone, the heater, blower, etc. is a recycle system from which the net amount of solvent recovered from the meal must be removed. This is accomplished by means of "bleeding" solvent vapor through a branch conduit or bleeder line which leads to a means to liquify the net vaporized solvent removed from the meal. The liquifying means may be a water cooled condenser wherein heat is absorbed from the solvent vapor thus lowering the temperature thereof and reducing it to a liquid which flows out through a pipe leading out of the system. Provision should be made for exhaust means to vent the condenser to allow for small quantities of non-condensible gases which are not liquified to be exhausted from the plant.

Since the vaporized solvent entering the vapor condenser will tend to carry some dust and fines residue picked up from the meal, a means of scrubbing dust out of the vapor to be condensed and to initiate liquification of the vapor may be included in the form of a water spray nozzle housed within the condenser housing near the entrance end thereof close to where vaporized solvent enters. The lower end of the condenser is thus a reflux section wherein cool water spray and condensed solvent has an initial cooling effect on the vapor coming into the condenser and the droplets of liquid tend to induce solvent liquification by acting as droplet vehicles upon which the solvent molecules will cling as the solvent vapor begins to condense in the comparatively low temperature environment within the condenser housing.

A notable feature of my invention was born from the realization that the overall time required for complete desolventization of an extracted solvent-wet material could be effectively shortened if steps and apparatus required in the treatment process could be combined without detracting from the system's potential effectiveness. I have successfully obviated the need for a separate housing for contacting material with solvent vapor that would be interconnected in the system by input and output conduits having associated means of conveying meal therethrough. This has been accomplished by utilizing a linear chamber. I have joined input and output conduits and increased the capacity thereof to form a continuous conduit chamber wherein the meal is contacted by superheated solvent and the motion of the solvent vapor flow provides the means of conveying the meal therethrough at the same time that vapor penetration and heat transfer is occurring. I have applied the same concept to further shorten the linear length of travel required of the meal under treatment by eliminating the need for a separately-contained aeration chamber. I have combined in a single elongated housing the means for cooling and final deodorization which is accomplished while the meal is enroute through the system. As compared to systems of the prior art wherein solvent-wet meal is either static or comparatively slow-moving while being contacted by gaseous means for solvent stripping, my system also includes the concept of first subjecting meal to an evaporation agent as an initial means of solvent stripping, and then subsequently to aeration as a means of final deodorization, both means under dynamic conditions in accordance with my objective of flash total desolventization.

Other objects, distinctive features, and advantages of my invention will be apparent from the following description when read in reference to the accompanying drawing which is a schematic illustration showing a preferred embodiment of the system of my invention.

As indicated in the drawing, the components which are systematically combined to form apparatus in accordance with a preferred embodiment of my invention may be generally summarized for convenience as follows:

(1) A first reaction chamber or mixing conduit 9 where superheated solvent vapor is charged into the solvent-wet meal;

(2) A desolventizer cyclone or high speed flash desolventizer 10 which is a second reaction chamber wherein solvent vapor is separated from substantially dry meal;

(3) A recycle blower 26 which motivates a solvent vapor flow that is continuously recirculated to the conduit chamber 9 from the flash desolventizer 10;

(4) A solvent heater 27 which superheats the recycled solvent vapor;

(5) A solvent condenser 31 which liquifies the net vaporized solvent that is bled from the solvent recycling circuit;

(6) A third reaction chamber that is a meal holder or reservoir 12 wherein desolventized meal is subjected to a second desolventizing step or deodorization by means of an inert gas deodorizing agent;

(7) A dust filter tank 14 for separating dust and fine powder from the vaporous inert gas flow that is exhausted from the reservoir 12;

(8) A fourth reaction chamber or aeration chamber 20 wherein cool air is intermixed with the meal discharged from the reservoir 12;

(9) A cool air blower 18 for providing the atmospheric air which aerates the meal in the chamber 20 with a heating means 17 provided to raise the temperature of the air, if required, prior to its introduction to the chamber 20;

(10) A fifth reaction chamber or a cooling cyclone or flash cooler 21 wherein air is separated from the meal prior to its ejection from the system and final meal cooling takes place;

(11) Meal feeder mechanisms or vapor lock valves 11, 16, and 22, provided at strategic points throughout the system as means of discharging meal from one major component of the system and into another, while preventing internal atmospheric communication between said components.

The solvent wet meal to be treated can be conducted into my system by a typical conveyor means which may be a screw conveyor 7, as shown in the drawing, which comprises cylindrical casing 7a having an internal rotating screw 7b. The moving mass of solvent-wet meal discharges from the conveyor 7 to a funneling tube 8. The funneling tube is a branch line extending from a conduit 9 which is actually a slender elongated mixing-chamber wherein the solvent-wet meal is subjected to a high velocity flow of superheated vaporized solvent. The meal is moved through the chamber 9 by the force of the flow of vaporized solvent which enters the chamber 9 through a passage or port situated at an angle to the funneling tube 8 so that meal and vaporized solvent converge to move through the conduit chamber 9. Not only is the conduit chamber 9 a mixing chamber but it acts also as a heat exchange chamber in which heat is transferred from the solvent vapor to the meal and to the solvent entrained therein in liquid form.

Thus, matter entering the conduit chamber 9 at its input end comprises (1) a solid substance, that is, the fine particulate meal, (2) liquid solvent entrained in the solid mass and (3) a high velocity fluid or gaseous form of high temperature solvent.

At the outlet end of the conduit chamber 9 the matter that exits therefrom is in a two-part form; (1) the solid mass of meal which has been substantially freed of the solvent that was entrained therein and, (2) the solvent vapor which exits from the conduit chamber at a greater quantity per unit time than that of the vapor which entered simultaneously with the meal at the input end of the chamber 9, having a temperature that is also substantially lower than the temperature of the solvent vapor entering at the chamber's input end.

The force of the high velocity vaporized solvent moving through the chamber 9 carries the meal into a flash desolventizer or solvent separator 10. The flash desolventizing unit 10 shown in the drawing comprises an upper cylindrical portion 10a with a lower portion 10b that converges toward its lower end so that it is in the form of an inverted cone frustum. Attached to the side wall of the upper cylindrical portion 10a of the flash desolventizer unit 10 is an entrance tube 10c which is curved slightly along its length to conform to the side wall curvature of portion 10a. The entrance tube 10c is smoothly contoured toward its end which opens into the cylindrical portion 10a so that the meal and solvent vapor that move rapidly therethrough will travel in a flow that tends to cling by centrifugal force to the inner wall of the cylindrical portion 10a. The high speed flow of solvent and meal thus whirls around the inner wall of the flash desolventizer 10 and the whirling flow is characterized by the meal spinning downward from gravitational force and inward against the inner wall of the converging portion 10b, while the hot solvent gas rises through the center of the flash desolventizer and up a path along the vertical axis thereof to be emitted from the flash desolventizer 10 by way of an exhaust opening 10d.

The hot solvent vapor emitted through the exhaust opening 10d enters a conduit 25 which is the entrance to a solvent recycling circuit that is a predominant feature of the system. The solvent vapor is conducted through the conduit 25 and into an input tube 26a of a recycle blower 26. A discharge tube 26b of the recycle blower 26 joins to a solvent heater unit 27 wherein the solvent vapor is reheated for subsequent injection into new meal to be treated in the conduit mixing chamber 9. The recycle blower 26, in combination with the solvent heater 27, provides the energy for the force that creates the extremely high speed flow of solvent and meal in the portion of the system thus far described.

The recycle blower 26, which is typical of such blowers or vapor pumps used in the industry for the purpose, draws vaporized solvent from the conduit 25 and in through its input side or tube 26a. The discharge tube 26b of the recycle blower 26 joins to the input end of the solvent heater 27, which is also apparatus common to the art.

The solvent heater 27 illustrated in the drawing has a cylindrical housing or tank 27a through which is extended a plurality of spaced-apart vapor conducting tubes 27b which are longitudinally suspended therein between typical tube sheets 27c and 27d. An upper transition portion 27e joins the heater 27 to the discharge side 26b of the recycle blower 26, and a similar transition portion 27f is provided at the lower end of the heater 27 to join it to an output conduit 28. The solvent heater 27 is provided with a steam entrance line 27g through which steam is conducted into the casing 27a where heat from the condensing steam is transferred through the walls of the tubes 27b and thence to the solvent vapor flowing through said tubes. Steam condensate is exhausted from the casing 27a by means of an outlet line 27h.

Heat is transferred from the tubes 27b to the plurality of vapor flows which move therethrough and the consequent expansion of the solvent vapor imparts additional impetus to the solvent flow discharging out through the lower transition portion 27f of the solvent heater 27. The steam flow through casing 27a in a preferred embodiment of my system is sufficient to keep the solvent vapor exiting from the heater at a temperature in the range of 120–150° F. higher than the atmospheric boiling point of the solvent. The solvent vapor thus heated moves rapidly through the conduit 28 which conducts the vapor flow through a reducer 28a to the input end of the conduit mixing-chamber 9.

A suitable throttling means in the nature of a flow-passage restriction or venturi 29 may be provided at the point where the solvent flow from conduit 28 enters the mixing chamber 9. The restriction or venturi 29 provides a narrowing throat through which the gaseous flow is forced thus effecting an increase in the velocity and reduction of pressure of the gas flowing therethrough just at the instant that the flow is converging with the solvent-wet meal flow moving downwardly through the funneling tube 8 to the mixing chamber 9. This reduction in pressure of the vapor flow as it blasts into the solvent-wet meal serves to "suck" the meal into the conduit while the high velocity propels the meal along the long length of the chamber 9 and, provides the rate of flow necessary to assure effective operation within the flash desolventizer cyclone unit 10.

Such variables as the rate of flow of the meal into the system and the length of the conduit chamber 9 and the temperature of the incoming meal will directly effect the temperature of the solvent vapor emitted through the opening 10b of the desolventizer unit 10. In a preferred embodiment of my system, when utilizing the organic solvent hexane as a desolventizing agent that leaves the solvent heater 27 of the recycling circuit at a temperature in the 290° F. range, an ideal temperature for the vapor leaving the desolventizer unit 10 is in the range of 230° F., and all functional variables of the system should be predetermined and controlled to maintain the desired temperatures. At the typical temperatures given thus far, the desolventized meal which moves helically downward in the flash desolventizer 10 will ideally be discharged therefrom at a temperature of 190° F.

A meal feeder mechanism or vapor seal valve 11 is provided as a means of discharging the desolventized meal from the unit 10 without permitting substantial internal atmospheric communication between the unit 10 and the meal holder or reservoir 12 into which the meal is fed. The vapor seal valve 11 is representative of the valves utilized to controllably discharge meal further on in the system, such as valve 16 which feeds meal from the reservoir 12 to the aeration chamber 20 and the valve 22 utilized to feed meal from the cooling cyclone 21 to a conveying means 23 which carries meal out of the system. Such valves are familiar to persons skilled in the art. Each valve comprises, as indicated on the drawing in reference to valve 11, a cylindrical housing 11a with a revolvable vaned rotor 11b mounted therein and forming compartments 11c between blades or vanes extended from its hub. The ends of the vanes move against the inside surface of the cylindrical housing 11a in an atmospheric-tight fit as a motor means 11d revolves the impeller 11b. The cylindrical housing 11a of the valve 11 is connectively joined to the output end of the flash desolventized 10 and is provided with an output tube 11e leading into the third reaction chamber of the system or meal reservoir 12. As the impeller 11b revolves and each successive compartment 11c moves into alignment with the output opening 10e of the flash desolventizer 10, meal discharges by gravity into each compartment 11c and is carried around into alignment with the output tube 11e of the valve 11 where it discharges by gravity therethrough into the reservoir 12 via an opening 12d provided therein. By moving the meal from the flash desolventizer 10 into the reservoir 12 in such compartmental increments, the undesired establishment of a gaseous interflow between the two chambers is minimized.

The third chamber of the system, reservoir 12, has a major cylindrical portion 12a with a converging lower portion 12b integral thereto. The cylindrical portion 12a is provided with an upper dome-shaped section 12c having an opening 12d through the center thereof for communication with the valve output tube 11e. The lower conical portion 12b has attached thereto an inert gas entrance pipe 12e through which inert gas such as carbon dioxide or nitrogen can be conducted into the reservoir 12, preferably at a temperature ranging between 85 and 105° F. The inert gas flow entering through the pipe 12e moves upwardly as a flow countercurrent to the downwardly pouring meal in the reservoir 12, and a gas exhaust means or opening 12g is provided therefor near the edge of the upper dome section 12c. The purpose of the inert gas flow is to remove traces of solvent yet remaining in the meal and carry them out through a vent pipe 13 which leads to a typical dust or fines residue filter or collector tank 14.

The fines residue tank 14 is provided with an entrance opening 14a through the side wall thereof and an exit or output opening 14b that is situated at the bottom of the tank so that it is below the level of the input opening 14a. A gas vent pipe 15 leads from the output opening 14b and interconnects to a typical overhead plant exhaust system represented by pipe 34.

After being cleansed of residual solvent by the countercurrent inert gas flow, the meal is next transferred from the reservoir 12 into a conduit or air-mixing chamber 20 by means of the vapor seal valve 16 feeding the meal through its output 16a and then through an opening 20a provided in the wall of the conduit chamber 20.

The aeration chamber 20, which is the fourth reaction chamber of the system, comprises a slender elongated housing or conduit wherein the third and final desolventizing step begins. An air blower 18 is provided to draw clean atmospheric air preferably from a point distant from the interior of the plant in which the system is located, and a heating means 17 is provided to preheat the incoming air sufficient to prevent condensation of moisture as the air passes to the aeration chamber 20. Whether or not heater 17 is utilized will depend upon exterior environmental conditions at the time the system is being operated. The heater 17 shown in the drawing comprises a plurality of vertical steam and conducting tubes 17a enclosed in an envelope or casing 17b. An input pipe 17c is provided to direct steam through the tube 17a and a steam output pipe 17d conducts the steam away from the heater.

The blower 18, which is actuated by motor means 18c, draws air from outside the plant and in through heater input 17e, through the envelope 17b and into the blower input tube 18a. An air passage conduit 19 interconnects with the discharge side 18b of the blower 18 and directs the air flow into the input end of the conduit chamber 20. The output end of the conduit 19 is provided with a reducer 19a in the shape of a conical transition that joins directly to the end of the conduit 20 and acts to restrict the flow coming from the conduit 19 and thus substantially increases the velocity of the flow which intermixes with the meal entering the chamber 20 through the opening 20a. The high velocity flow thus created also acts as the propulsion means to carry the meal along the chamber 20's length and into the system's fifth reaction chamber, a cooling cyclone unit 21.

The cooling cyclone unit 21 comprises an upper cylindrical portion 21a with an integral converging lower portion 21b. An entrance tube 21c leads into the upper cylindrical portion 21a and is positioned similar to that of the entrance tube 10c leading into the cylindrical portion 10a of the desolventizing unit 10. In this fifth chamber of the system, the cooling cyclone 21, the high speed mixture of meal and air shoots into the cylindrical portion 21a by way of the entrance tube 21c and whirls around, following the interior surface of the side wall thereof, and gravitation force causes the whirling meal to spiral downwardly in a helical fashion to where it is discharged through an output opening 21e. Since heat has transferred from the desolventized meal to the cool air during the intermixing aeration operation in chamber 20 and during the preliminary whirlpool action within the cooling cyclone 21, the heated air will rise along the vertical axis of the cooling cyclone 21 and be emitted through a vent opening 21d provided therefor from whence it can be exhausted back into the atmosphere. The high speed aeration of the meal enables recovery of a cool product from the cooling cyclone 21. It is a product that has been finally cleansed of any trace or suggestion of solvent that may have clung to the meal mass after its departure from the reservoir 12 where it was subjected to the inert gas filtering process.

Referring now to the recycling circuit sub-system, connecting the flash desolventizer 10 with the mixing chamber 9, solvent vapor moving therethrough tends to increase in quantity as additional solvent is continuously removed from meal treated within the conduit chamber 9 and the flash desolventizer 10. To maintain the quantity of solvent in the recycling system at a suitable level a bleeding means should be provided and may be in the form of a pipe 30 which joins to conduit 25 at an opening 25a provided therefor. As the solvent vapor continuously builds up beyond the amount which the recycling circuit can handle, the surplus of vapor is conducted out through the pipe 30 which introduces the solvent vapor to a condensing means so that the solvent can be recovered as a liquid.

A condensing means 31 which may be utilized in my system comprises a cylindrical tank 31a with internal longitudinal tubes 31b suspended between typical tube sheets 31c and 31d which enclose between them an intermediate heat exchange casing 31a. Cooling water flows into the casing 31a by means of an inlet pipe 31e and flows out therefrom through an outlet pipe 31f. The condenser unit 31 is vented by means of an opening 31g in the top thereof, and a lower opening or exit pipe 31h is provided to carry away solvent condensate.

As excess solvent vapor moves out of the recycling sub-system and through pipe 30 it enters a reflux section 32 within the lower end of the condenser 31. The reflux section 32 comprises a means of showering the incoming solvent vapor with a spray of fine water droplets and is provided therein with a spray nozzle 32a receiving a water flow through an inlet pipe 32b. The fine water spray is picked up in its droplet form and carried by the warm vapor that moves up through the tubes 31b in a plurality of parallel flows where the vapor will begin condensing on the water droplets as it is cooled within the tubes 31b. Not only does the water spray injected by the nozzle 32a provide a vehicle to initiate condensation of vapor solvent but water droplets moving through the solvent that moves upwardly toward the region of the casing 31a will tend to scrub out fine dust particles which may be carried in the vapor solvent flow from the recycling circuit, helping to prevent residue encrustation within the tubes 31b and enabling a cleaner vapor exhaust which may vent out through the opening 31g of the condenser 31. The liquified solvent that falls back from the region of the tubes 31b and through the reflux section 32 will spill out through the outlet pipe 31h as a mixture of water and solvent to be carried to a solvent separator that is remote from the system.

Thus, the system that I provide is a new and improved system comprising a unique combination of high-speed reaction chambers in conjunction with various means of creating the desired reactions therein to ultimately transform solvent-wet meal into a refined and useable product. My system provides a process of injecting solvent which has been preheated to a temperature above the vaporization temperature of solvent residing in meal under treatment, separating the solvent and meal under high speed conditions, continuing the desolventizing process by inert gas stripping which is followed by air stripping and cooling. It is a process and a system especially adapted to the desolventizing of material in powder form wherein the single step of flash desolventizing is not considered adequate. The system will lend itself to various embodiments and changes such as the intentional lengthening of mixing chambers to increase retention time or the variance of speeds of the ejection means between chambers, etc. Adaptability of the system and process disclosed herein to enable the treatment of various different materials is expressly anticipated, as is the system's coupling-adaption to various systems or subsequent product treatment facilities.

What I claim is:

1. A system for stripping solvent from organic material of the class wherein material to be stripped is of fine-particle consistency and is contacted with a recycled flow of vaporized solvent at a temperature above the vaporization temperature of said solvent, said system comprising in combination:
(1) a first reaction chamber having vaporized solvent injection means for contacting said material with said recycled flow of vaporized solvent;
(2) a second reaction chamber for flash separating said vaporized solvent from said material;
(3) circuit means for recycling said vaporized solvent from said second reaction chamber to said first reaction chamber;
(4) heating means for increasing the temperature of said vaporized solvent prior to its injection into said first reaction chamber;
(5) means of increasing the velocity of said recycled vaporized solvent flow prior to its injection into said first reaction chamber;
(6) bleeding means for removing excess solvent from said circuit means;
(7) condensing means for liquifying said vaporized solvent recovered through said bleeding means;
(8) reflux means integral to said condensing means for inducing said liquification and scrubbing fine dust particles therefrom;
(9) a third reaction chamber having injection means for feeding inert gas therein and through said material;
(10) vent means for exhausting said inert gas from said third reaction chamber, with filtering means for removing dust from said exhausted inert gas;
(11) a fourth reaction chamber for contacting cool air with said material;
(12) blower means for producing a substantial air flow for said contacting of said material;
(13) means of increasing the velocity of said air flow immediately prior to said contacting;
(14) a fifth reaction chamber for separating said air from said material;
(15) first vapor seal valve means for passing said material from said second reaction chamber to said third reaction chamber;
(16) second vapor seal valve means for passing said material from said third reaction chamber to said fourth reaction chamber;
(17) third vapor seal valve means for passing said material from said fifth reaction chamber.

2. A system as described in claim 1 as characterized by having:
(18) heating means for raising the temperature of said air flow produced by said blower means.

3. A system for stripping solvent from organic material of the class wherein material to be stripped is of fine-particle consistency and is contacted with a recycled flow of vaporized solvent at a temperature above the vaporization temperature of said solvent, said system comprising in combination:
(1) a first reaction chamber having a material inlet passage and vaporized solvent injection means for contacting said material with said recycled flow of vaporized solvent;
(2) a second reaction chamber for flash separating said vaporized solvent from said material;
(2a) circuit means for recycling said vaporized solvent from said second reaction chamber to said first reaction chamber;
(3) means of reducing the pressure of said recycled vaporized solvent flow prior to contacting said material with vaporized solvent in said first reaction chamber;
(4) bleeding means for removing solvent vapor from said recycled flow;
(5) a third reaction chamber having injection means for feeding inert gas therein and through said material;
(6) a fourth reaction chamber for cooling said material with atmospheric air;
(7) means of increasing the velocity of said air flow immediately prior to said cooling;
(8) a fifth reaction chamber for flash separating said air from said material;
(9) first vapor seal valve means for passing said material from said second reaction chamber to said third reaction chamber;
(10) second vapor seal valve means for passing said material from said third reaction chamber to said fourth reaction chamber;
(11) third vapor seal valve means for passing said material from said fifth reaction chamber.

4. A system for stripping solvent from organic material of the class wherein material to be stripped is of fine-particle consistency and is contacted with a recycled flow of vaporized solvent at a temperature above the vaporization temperature of said solvent, said system comprising in combination:
(1) a first reaction chamber having a material inlet passage and vaporized solvent injection means for contacting said material with said recycled flow of vaporized solvent;
(2) a second reaction chamber for flash separating said vaporized solvent from said material;
(2a) circuit means for recycling said vaporized solvent from said second reaction chamber to said first reaction chamber;
(3) means for converting a portion of the pressure of said recycled vaporized solvent flow to kinetic energy prior to contacting said material with said solvent flow in said first reaction chamber;
(4) a third reaction chamber having injection means for feeding inert gas therein and through said material;
(5) a fourth reaction chamber for flooding cool air into said material;
(6) means of increasing the velocity of said air flow immediately prior to said flooding;
(7) a fifth reaction chamber for separating said air from said material;
(8) valve means for passing material between some of said chambers and out of said system, and means for obstructing gaseous flow through said valve means.

5. A system for stripping solvent from organic material of the class wherein material to be stripped is of fine-particle consistency and is contacted with a recycled flow of vaporized solvent at a temperature above the vaporization temperature of said solvent, said system comprising in successive flow connection:

11

(1) a first reaction chamber for mixing said vaporized solvent with said material;
(2) a second reaction chamber for separating said vaporized solvent from said material;
(2a) circuit means for recycling said vaporized solvent from said second reaction chamber to said first reaction chamber;
(3) a third reaction chamber having injection means for feeding inert gas therein and through said material;
(4) a fourth reaction chamber for flooding cool air into said material;
(5) a fifth reaction chamber for separating said air from said material.

6. In the desolventization treatment of organic material wherein solvent-wet material is successively treated in at least three desolventizing stages having successively declining respective temperatures, the process comprising the steps of:
  (1) contacting solvent-wet material in the first of said stages with a high-velocity co-current flow of solvent vapor that has been superheated to a temperature substantially above the vaporization temperature of such solvent;
  (2) separating vaporized solvent from said material;
  (3) continuously recycling said vaporized solvent and reheating it for continuous contacting of solvent-wet material as described in step 1;
  (4) contacting said separated material in the second of said stages with a countercurrent inert gas flow while said material still retains substantial heat absorbed during step 1;
  (5) separating said inert gas from said material;
  (6) contacting said material in the third of said stages with a co-current high-velocity flow of cool air;
  (7) separating said air from said material.

7. In the desolventization treatment of organic material wherein solvent-wet material is successively treated in at least three desolventizing stages having successively declining respective temperatures, the process comprising the steps of:
  (1) contacting solvent-wet material in the first of said stages with a high-velocity flow of solvent vapor that has been preheated to a temperature substantially above the vaporization temperature of such solvent;

12

(2) flash separating vaporized solvent from said material;
  (3) continuously recycling said vaporized solvent and preheating it for continuous contacting of solvent-wet material as described in step 1;
  (4) contacting said separated material in the second of said stages with an inert gas flow;
  (5) separating said inert gas from said material;
  (6) contacting said material in the third of said stages with a flow of cool air;
  (7) separating said air from said material.

8. In the desolventization treatment of organic material wherein solvent-wet material is successively treated in at least three desolventizing stages having successively declining respective temperatures, the process comprising the steps of:
  (1) contacting said material in the first of said stages with a high-velocity co-current flow of pure superheated solvent vapor;
  (2) separating vaporized solvent from said material;
  (3) continuously recycling said vaporized solvent for continuous contacting of solvent-wet material as described in step 1;
  (4) superheating said recycled solvent vapor sufficient to vaporize liquid solvent entrained in said material;
  (5) contacting said separated material in the second of said stages with a countercurrent inert gas flow while said material still retains substantial heat absorbed during step 1;
  (6) separating said inert gas from said material;
  (7) contacting said material in the third of said stages with a co-current high-velocity flow of cool air;
  (8) separating said air from said material.

References Cited

UNITED STATES PATENTS

| 2,375,288 | 5/1945 | Dennis | 34—10 |
| 2,406,395 | 8/1946 | Noel | 34—10 |
| 2,691,830 | 10/1954 | Karnofsky | 34—37 X |
| 3,152,872 | 10/1964 | Scoggin et al. | 34—36 X |
| 3,190,867 | 6/1965 | Oldweiler et al. | 34—10 |

FREDERICK L. MATTESON, JR., *Primary Examiner.*

D. A. TAMBURRO, *Assistant Examiner.*